United States Patent
Yoo et al.

(10) Patent No.: US 10,630,977 B2
(45) Date of Patent: Apr. 21, 2020

(54) METHOD AND APPARATUS FOR ENCODING/DECODING A VIDEO SIGNAL

(71) Applicant: LG Electronics Inc., Seoul (KR)

(72) Inventors: Sunmi Yoo, Seoul (KR); Jin Heo, Seoul (KR); Junghak Nam, Seoul (KR); Jaehyun Lim, Seoul (KR); Yongjoon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 112 days.

(21) Appl. No.: 15/565,092

(22) PCT Filed: Nov. 9, 2015

(86) PCT No.: PCT/KR2015/012018
§ 371 (c)(1),
(2) Date: Oct. 6, 2017

(87) PCT Pub. No.: WO2016/163616
PCT Pub. Date: Oct. 13, 2016

(65) Prior Publication Data
US 2018/0124397 A1    May 3, 2018

Related U.S. Application Data

(60) Provisional application No. 62/195,772, filed on Jul. 22, 2015, provisional application No. 62/144,906, filed on Apr. 8, 2015.

(51) Int. Cl.
*H04N 19/109* (2014.01)
*H04N 19/176* (2014.01)
(Continued)

(52) U.S. Cl.
CPC ......... *H04N 19/109* (2014.11); *H04N 19/107* (2014.11); *H04N 19/119* (2014.11);
(Continued)

(58) Field of Classification Search
USPC ...................................... 375/240.12
See application file for complete search history.

(56) References Cited

U.S. PATENT DOCUMENTS

2012/0307894 A1* 12/2012 Chien ............... H04N 19/176
375/240.12
2013/0070848 A1    3/2013 Guo et al.
(Continued)

FOREIGN PATENT DOCUMENTS

| CN | 103563389 | 2/2014 |
| JP | 20130232956 | 11/2013 |
| KR | 1020110018188 | 2/2011 |

OTHER PUBLICATIONS

Kumakum et al., "Intra prediction mode coding based on direction difference," JVC Kenwood Holdings, Inc., 6th meeting, Jul. 2011, 14 pages.

(Continued)

*Primary Examiner* — Behrooz M Senfi
(74) *Attorney, Agent, or Firm* — Fish & Richardson P.C.

(57) ABSTRACT

A method for decoding a video signal includes obtaining block partition information of a current coding unit; deriving an intra prediction mode of a partition block based on the block partition information; and generating a prediction signal of the partition block based on the derived intra prediction mode, and the intra prediction mode of the partition block is defined by a limited number based on a prediction direction.

4 Claims, 17 Drawing Sheets

(51) Int. Cl.
  *H04N 19/119* (2014.01)
  *H04N 19/157* (2014.01)
  *H04N 19/70* (2014.01)
  *H04N 19/107* (2014.01)
  *H04N 19/593* (2014.01)
  *H04N 19/96* (2014.01)

(52) U.S. Cl.
  CPC ......... *H04N 19/157* (2014.11); *H04N 19/176* (2014.11); *H04N 19/70* (2014.11); *H04N 19/593* (2014.11); *H04N 19/96* (2014.11)

(56) References Cited

U.S. PATENT DOCUMENTS

2015/0341641 A1* 11/2015 Kolesnikov .......... H04N 19/176
 375/240.02
2017/0127090 A1* 5/2017 Rosewarne ............ H04N 19/86

OTHER PUBLICATIONS

International Search Report in International Application No. PCT/KR2015/012018, 8 pages.
Guo L et al: "Non-CE6: Line buffer reduction for CABAC context of SDIP syntax", 'JCTVC-G754', Joint Collaborative Team on Video Coding (JCT-VC) of ITU-T SG16 WP3 and ISO/IEC JTC1/SC29/WG11, 7th Meeting: Geneva, Nov. 21-30, Nov. 9, 2011, 8 pages.
Silcock P et al: "AHG12: Extension of HM7 6-8 to Support Additional Chroma Formats", 'JCTVC-J0191', Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Jul. 2, 2012, 16 pages.
Supplementary Partial European Search Report in European Application No. 15888601.0, dated Oct. 9, 2018, 12 pages.
Chinese Office Action in Chinese Application No. 201580078654.9, dated Sep. 17, 2019, 14 pages (with English translation).

* cited by examiner

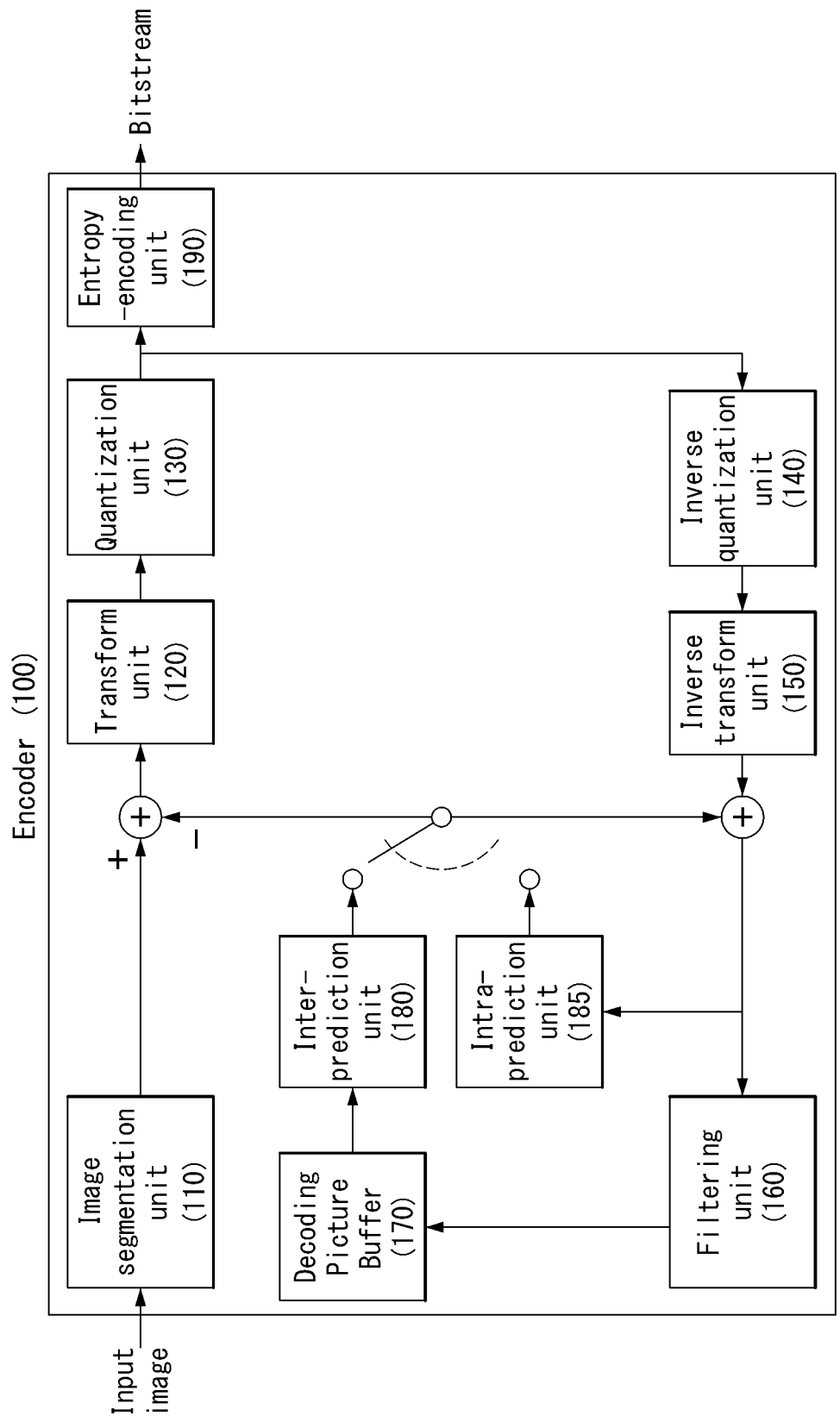
[FIG. 1]

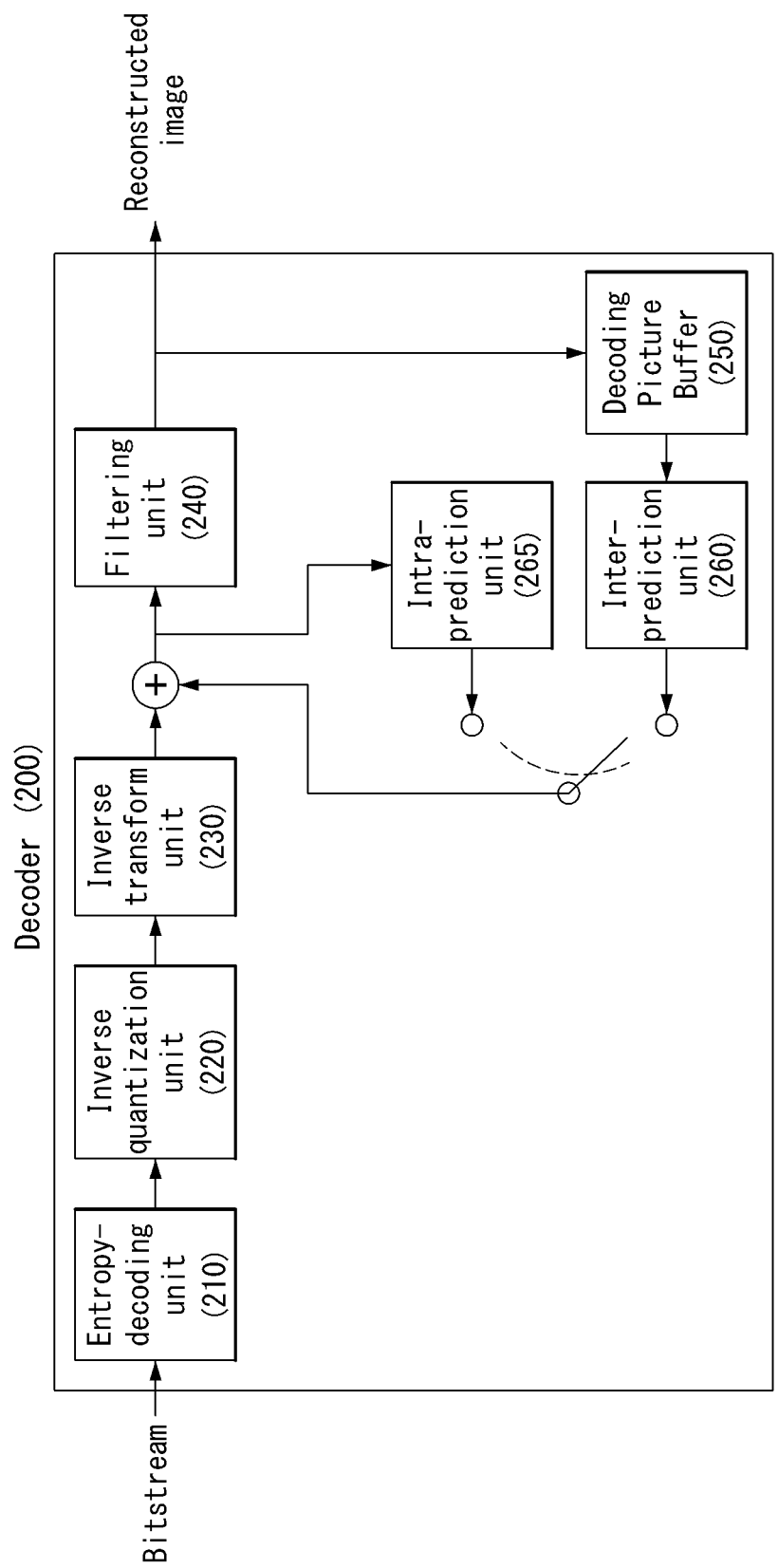
[FIG. 2]

[FIG. 3A]
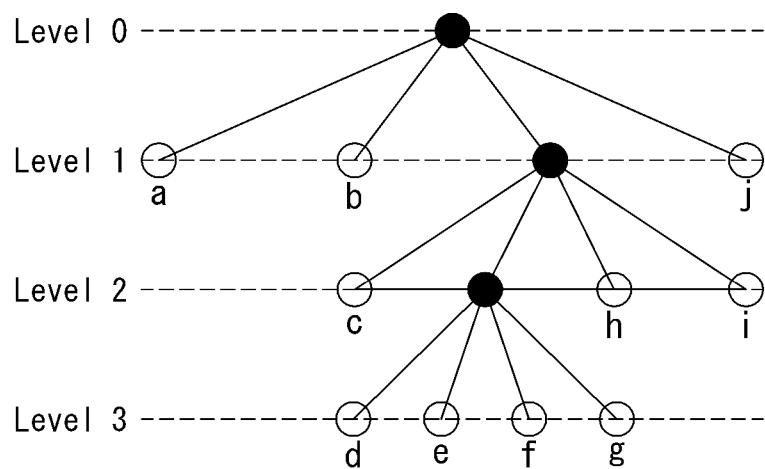
[FIG. 3B]
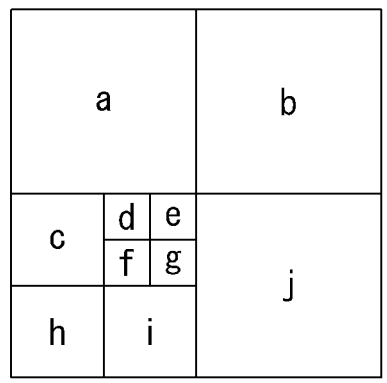

[FIG. 4]
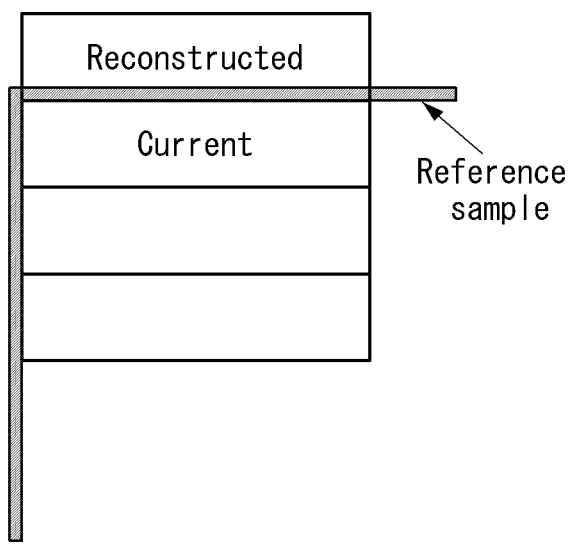

[FIG. 5A]
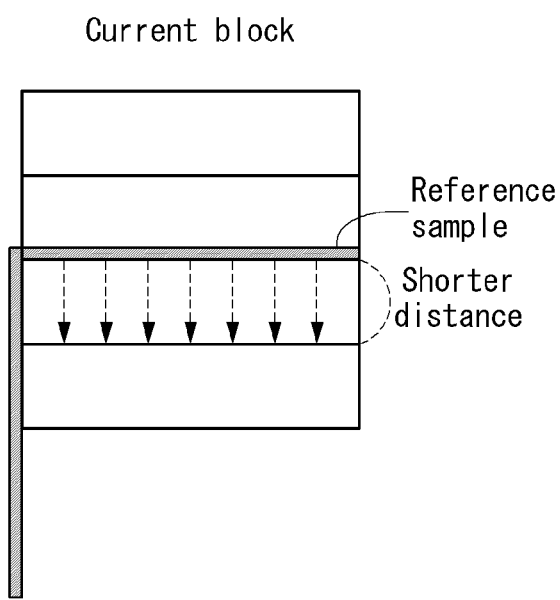
[FIG. 5B]
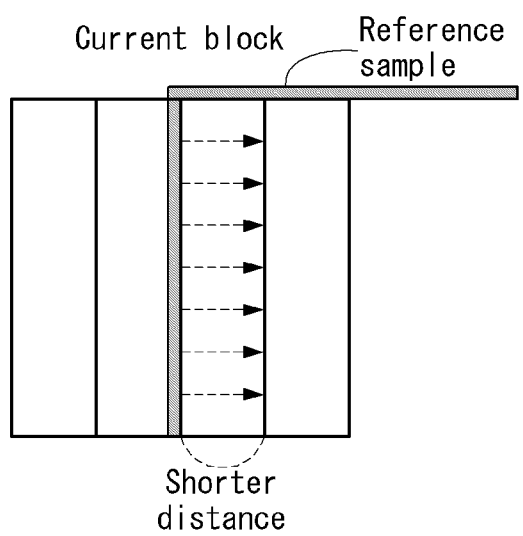

[FIG. 6]

| coding_unit(x0, y0, log2CbSize) { | Descriptor |
|---|---|
| ... | |
|   part_size | ae(v) |
|   if( currCU == MODE_INTRA) | |
|     sdip_flag | ae(v) |
|   if(sdip_flag) | |
|     sdip_direction | ae(v) |
| ... | |
|   for(i=0; i<4; i++) { | |
|     if(currCU == MODE_INTRA && sdip_flag && sdip_direction) { | |
|       prev_intra_luma_pred_flag[i] | ae(v) |
|       if(prev_intra_luma_pred_flag[i]) | |
|         mpm_idx[i] | ae(v) |
|       else | |
|         rem_intra_luma_pred_mode[i] | ae(v) |
|     } | |
|   } | |
| ... | |
| } | |

S610 — part_size
S620 — sdip_flag
S630 — sdip_direction
S640 — prev_intra_luma_pred_flag[i]
S650 — if(prev_intra_luma_pred_flag[i])
S660 — mpm_idx[i]
S670 — rem_intra_luma_pred_mode[i]

[FIG. 7]
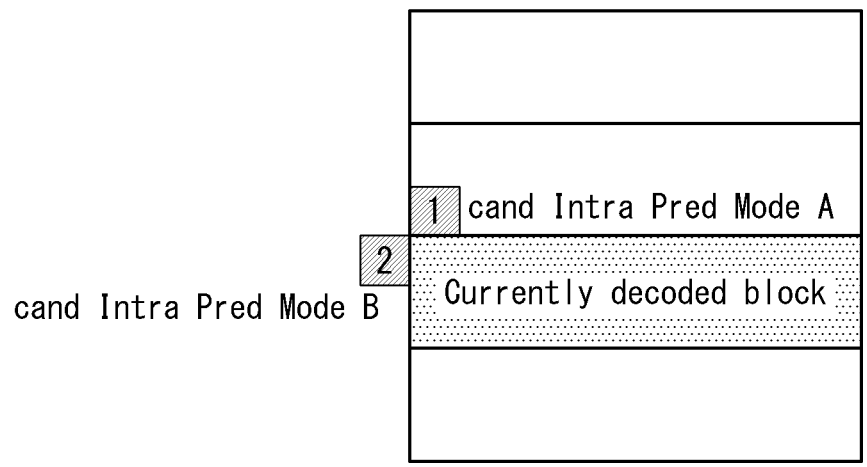

[FIG. 8]
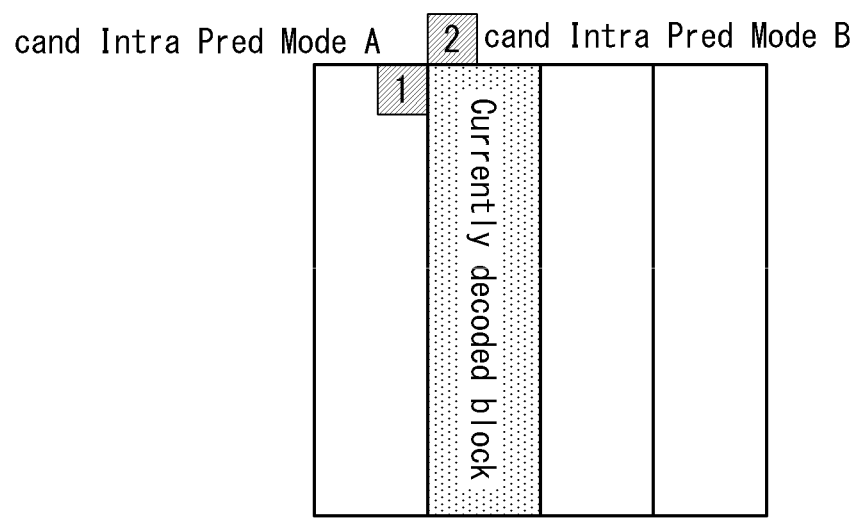

[FIG. 9]
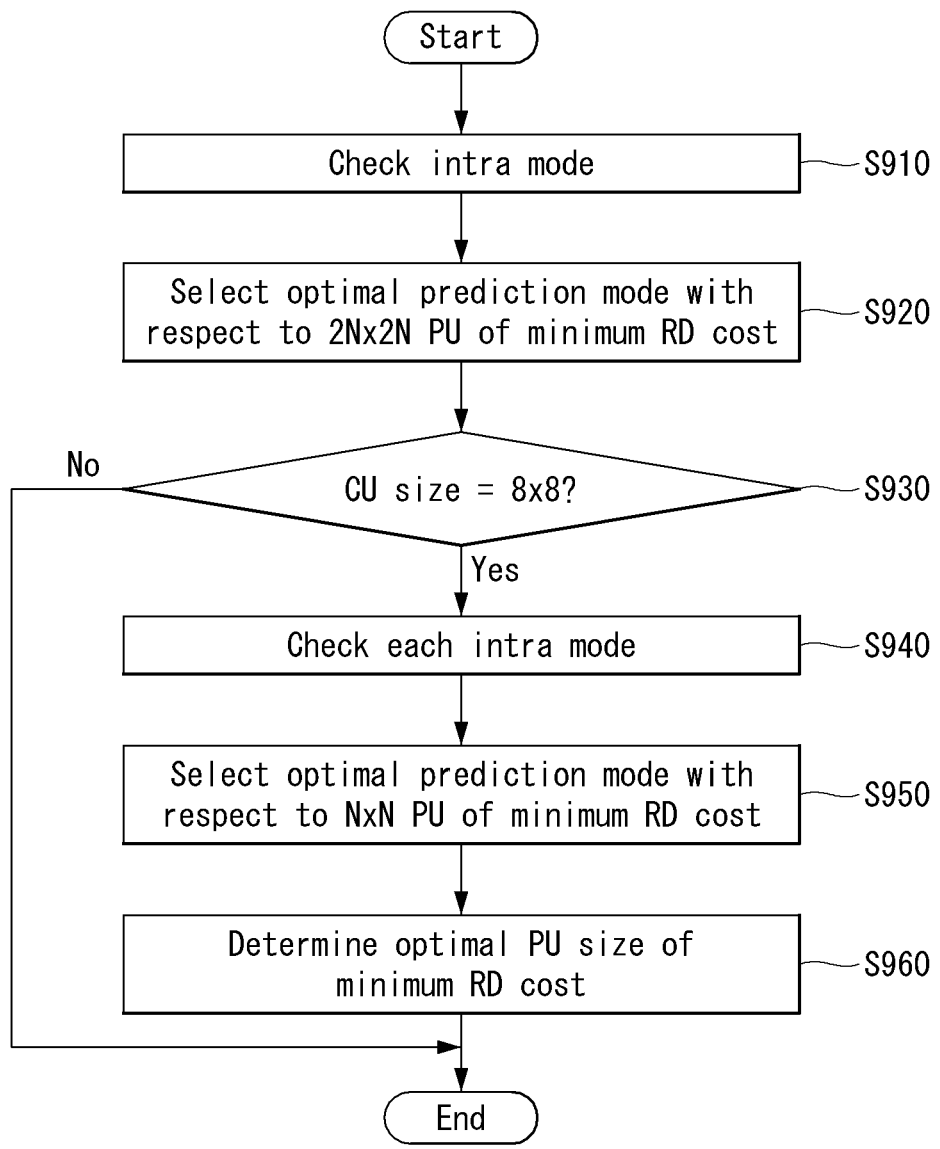

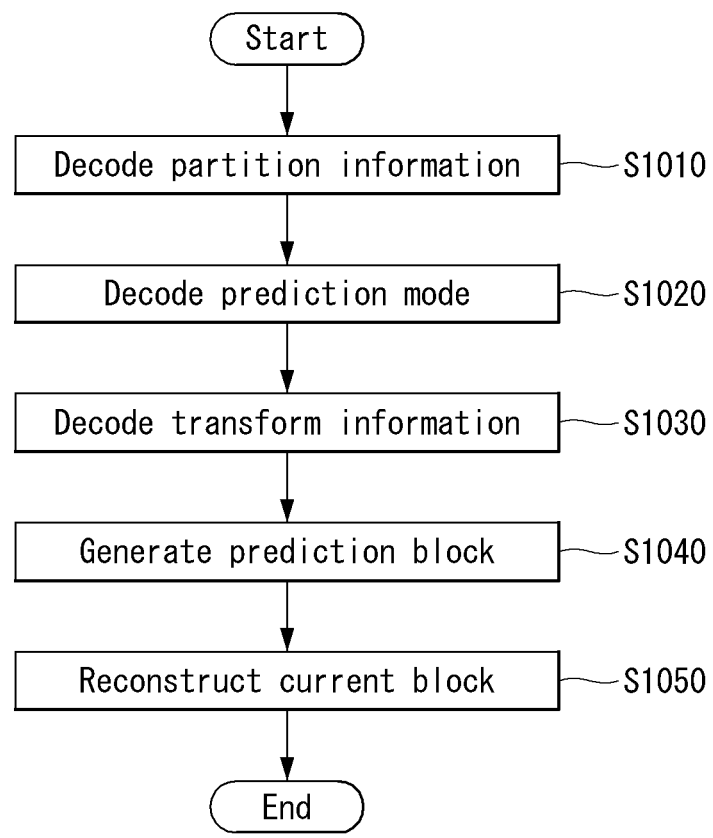
[FIG. 10]

[FIG. 11A]
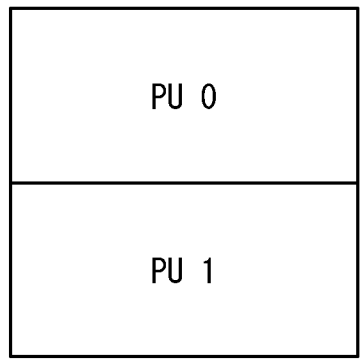
[FIG. 11B]
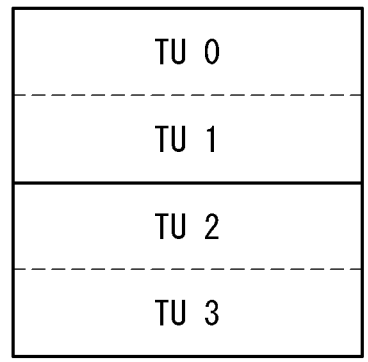

[FIG. 12A]
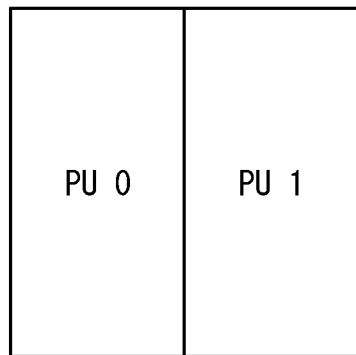
[FIG. 12B]
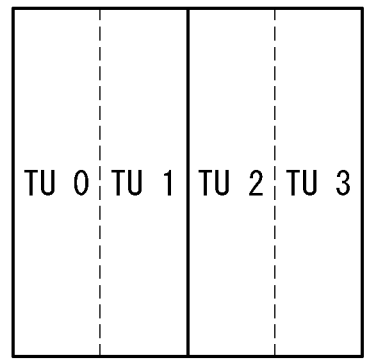

[FIG. 13A]
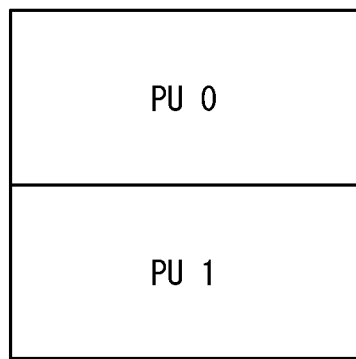
[FIG. 13B]
| TU 0 | TU 1 |
|------|------|
| TU 2 | TU 3 |
| TU 4 | TU 5 |
| TU 6 | TU 7 |

[FIG. 14A]
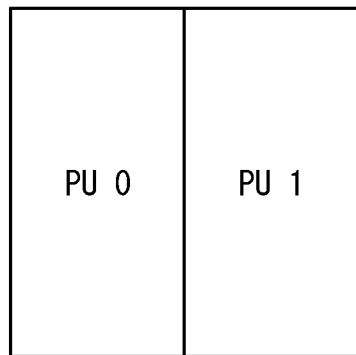
[FIG. 14B]
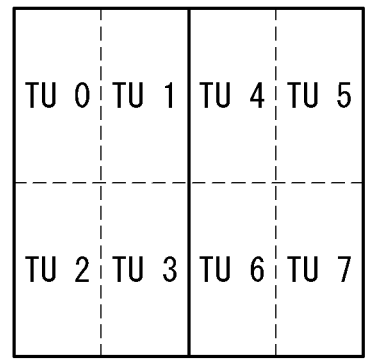

[FIG. 15A]
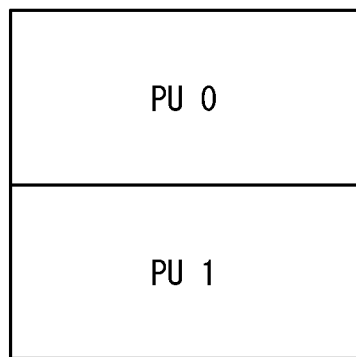
[FIG. 15B]
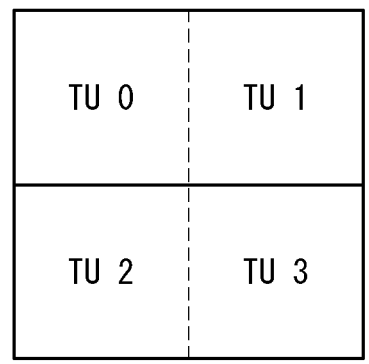

[FIG. 16A]
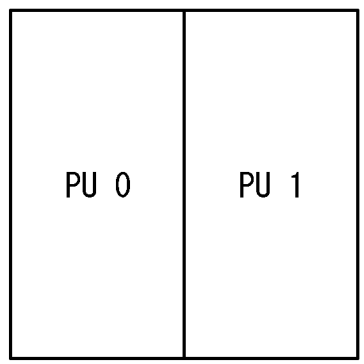
[FIG. 16B]
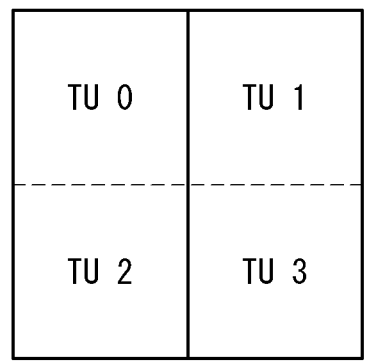

[FIG. 17]
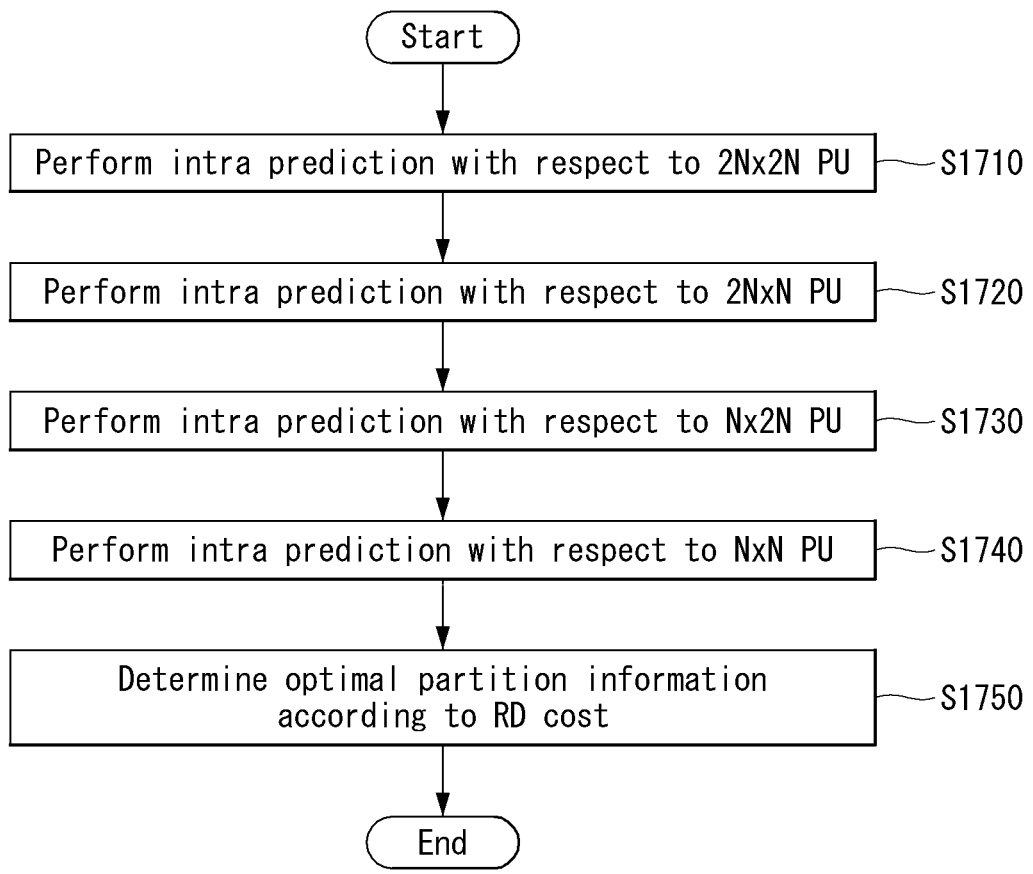

METHOD AND APPARATUS FOR ENCODING/DECODING A VIDEO SIGNAL

CROSS-REFERENCE TO RELATED APPLICATIONS

This application is the National Stage filing under 35 U.S.C. 371 of International Application No. PCT/KR2015/012018, filed on Nov. 9, 2015, which claims the benefit of U.S. Provisional Applications No. 62/144,906, filed on Apr. 8, 2015, and No. 62/195,772, filed on Jul. 22, 2015, the contents of which are all hereby incorporated by reference herein in their entirety.

TECHNICAL FIELD

The present invention relates to a method and apparatus for encoding/decoding a video signal, and more particularly, to a method and apparatus for encoding/decoding an intra picture.

BACKGROUND ART

Compression encoding means a series of signal processing technology for transmitting digitalized information through a communication line or for storing digitalized information in a form appropriate to a storage medium. Media such video, an image, and a voice may be a target of compression encoding, particularly, technology that performs compression encoding using video as a target is referred to as video compression.

Next generation video contents will have a characteristic of a high spatial resolution, a high frame rate, and high dimensionality of scene representation. In order to process such contents, memory storage, memory access rate, and processing power technologies will remarkably increase.

Therefore, it is necessary to design a coding tool for more efficiently processing next generation video contents.

Particularly, the intra prediction uses a partition in square shape, and such a method has little error when predicting a sample located near to a reference sample, but the accuracy may be degraded as the distance between the reference sample and a prediction sample increases. Accordingly, it is required to supplement the disadvantage in order to decrease prediction error.

DISCLOSURE

Technical Problem

The present invention is to define a prediction unit, which is a unit of prediction of an intra block, in a rectangular shape or a line shape, and to propose a method of coding it.

In addition, in the case that a prediction unit of an intra block is defined in a rectangular shape, the present invention is to propose a method for coding it into a Quadtree transform unit of a square shape.

In addition, in the case that a prediction unit of an intra block is defined in a rectangular shape, the present invention is to propose a method for coding it into a Quadtree transform unit of a rectangular shape.

Technical Solution

The present invention provides a coding method based on a relation between a direction of prediction mode and block partition information when performing an intra coding.

In addition, the present invention provides a method for deriving a prediction mode based on block partition information.

In addition, the present invention provides a method for determining the optimal shape of a prediction unit in the aspect of an RD cost based on a size of a coding unit.

In addition, the present invention provides a method for defining a transform unit when an intra block is partitioned into plural prediction blocks.

In addition, the present invention provides a method for performing a prediction based on a distance from a reference pixel.

Technical Effects

According to the present invention, a prediction unit, which is a unit of prediction of an intra block, is defined in a rectangular shape or a line shape, and accordingly, a prediction and a reconstruction of an interior of a coding block may be performed smaller rectangular shape or a line shape, thereby a prediction error being decreased.

In addition, according to the present invention, by decreasing an amount of data of a residual signal generated when encoding a still image or a video image, a video signal may be processed more efficiently.

In addition, according to the present invention, in the case that a coding unit includes a plurality of prediction units, since each prediction unit may have different intra prediction modes, more detailed intra prediction may be performed.

In addition, according to the present invention, in the case of generating a prediction block, more accurate prediction block may be generated according to a reference pixel position determined by a prediction mode, and accordingly, an amount of data of a residual signal may be decreased, thereby an amount of energy for transmitting it being decreased.

DESCRIPTION OF DRAWINGS

FIG. 1 is a block diagram illustrating a configuration of an encoder for encoding a video signal according to an embodiment of the present invention.

FIG. 2 is a block diagram illustrating a configuration of a decoder for decoding a video signal according to an embodiment of the present invention.

FIGS. 3A and 3B are diagrams illustrating a division structure of a coding unit according to an embodiment of the present invention.

FIG. 4 and FIGS. 5A and 5B are diagrams for describing a method for performing an intra prediction based on a relation between block partition information and a directionality of a coding mode as embodiments to which the present invention is applied.

FIG. 6 illustrates a syntax structure for describing a process of deriving a prediction mode based on the Short Distance Intra Prediction (SDIP) direction information as an embodiment to which the present invention is applied.

FIG. 7 and FIG. 8 are diagrams for describing a method for configuring Most Probable Mode (MPM) index based on the Short Distance Intra Prediction (SDIP) direction information as an embodiment to which the present invention is applied.

FIG. 9 is a flowchart for describing a process of determining the best prediction unit based on a size of coding unit as an embodiment of the present invention.

FIG. 10 is a flowchart for describing a decoding process when a coding unit includes a plurality of transform units as an embodiment of the present invention.

FIGS. 11A, 11B, and FIGS. 12A, 12B are diagrams for describing a method of defining a transform unit in a rectangular shape when an intra block is divided into a plurality of prediction units as embodiments to which the present invention is applied.

FIGS. 13A, 13B, and FIGS. 14A, 14B are diagrams for describing a method of splitting a transform unit in a rectangular shape based on a coding unit or a prediction unit when an intra block is divided into a plurality of prediction units as embodiments to which the present invention is applied.

FIGS. 15A, 15B, and FIGS. 16A, 16B are diagrams for describing a method of defining a transform unit in a square shape when an intra block is divided into a plurality of prediction units as embodiments to which the present invention is applied.

FIG. 17 is a flowchart for describing a process of determining optimal partition information in the aspect of RC cost as an embodiment to which the present invention is applied.

BEST MODE FOR INVENTION

The present invention provides a method for decoding a video signal including obtaining block partition information of a current coding unit; deriving an intra prediction mode of a partition block based on the block partition information; and generating a prediction signal of the partition block based on the derived intra prediction mode, and the intra prediction mode of the partition block is defined by a limited number based on a prediction direction.

In addition, the present invention further includes receiving flag information indicating whether the current coding unit is partitioned based on a distance from a reference sample.

In addition, in the present invention, the intra prediction mode of the partition block is derived, when the current coding unit is partitioned based on the distance from the reference sample.

In addition, the present invention further includes receiving direction information indicating a partition direction of the current coding unit, when the current coding unit is partitioned based on the distance from the reference sample.

In addition, in the present invention, the partition direction of the current coding unit indicates a horizontal direction or a vertical direction.

In addition, in the present invention, the intra prediction mode is derived by a summation of a transmitted prediction mode value and an offset value.

In addition, in the present invention, the offset value is determined based on the direction information.

In addition, in the present invention, the offset value corresponds to a minimum value among values indicating a prediction mode of a vertical direction when the direction information indicates a horizontal direction, and indicates 0 otherwise.

In addition, the present invention provides a method for encoding a video signal including performing an intra prediction with respect to a first prediction unit of a current coding unit; determining an optimal intra prediction mode with respect to the first prediction unit; checking a size of the current coding unit; performing an intra prediction with respect to a second prediction unit when the current coding unit corresponds to a predetermined size; determining an optimal intra prediction mode with respect to the second prediction unit; determining a size of an optimal prediction unit based on a rate-distortion cost of the first prediction unit and the second prediction unit; and generating a prediction block based on the size of the optimal prediction unit.

In addition, in the present invention, the optimal prediction unit is a rectangular or a square shape.

In addition, in the present invention, a shape of a transform unit in the current coding unit is determined based on a shape of the optimal prediction unit.

In addition, in the present invention, the transform unit is decomposed in Quadtree or in Octatree based on the current coding unit.

In addition, in the present invention, the transform unit includes at least one rectangular type or square type in the current coding unit.

In addition, in the present invention, partition information of the optimal prediction unit is included in at least one of a sequence parameter set, a picture parameter set, a slice header or a coding unit header.

MODE FOR INVENTION

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

Meanwhile, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The prediction signal generated via the inter-prediction unit 180 or the intra-prediction unit 185 may be used to generate the reconstructed signal or used to generate the residual signal.

FIG. 2 shows a schematic block diagram of a decoder for decoding a video signal, in accordance with one embodiment of the present invention.

Referring to FIG. 2, a decoder 200 may include an entropy-decoding unit 210, an inverse quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

The inverse quantization unit 220 may obtain a transform coefficient from the entropy-decoded signal using quantization step size information. Here, the obtained transform coefficient may be that of various embodiments are applied, which are described in transform unit 120 of FIG. 1.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIGS. 3A and 3B are diagrams illustrating a division structure of a coding unit according to an embodiment of the present invention.

The encoder may split one video (or picture) in a coding tree unit (CTU) of a quadrangle form. The encoder sequentially encodes by one CTU in raster scan order.

For example, a size of the CTU may be determined to any one of 64×64, 32×32, and 16×16, but the present invention is not limited thereto. The encoder may select and use a size of the CTU according to a resolution of input image or a characteristic of input image. The CTU may include a coding tree block (CTB) of a luma component and a coding tree block (CTB) of two chroma components corresponding thereto.

One CTU may be decomposed in a quadtree (hereinafter, referred to as 'QT') structure. For example, one CTU may be split into four units in which a length of each side reduces in a half while having a square form. Decomposition of such a QT structure may be recursively performed.

Referring to FIGS. 3A and 3B, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, a size of the CU may be determined to any one of 64×64, 32×32, 16×16, and 8×8, but the present invention is not limited thereto, and when video is high resolution video, a size of the CU may further increase or may be various sizes.

Referring to FIG. 3A, the CTU corresponds to a root node and has a smallest depth (i.e., level 0) value. The CTU may not be split according to a characteristic of input image, and in this case, the CTU corresponds to a CU.

The CTU may be decomposed in a QT form and thus subordinate nodes having a depth of a level 1 may be generated. In a subordinate node having a depth of a level 1, a node (i.e., a leaf node) that is no longer split corresponds to the CU. For example, as shown in FIG. 3B, CU(a), CU(b), and CU(j) corresponding to nodes a, b, and j are split one time in the CTU and have a depth of a level 1.

At least one of nodes having a depth of a level 1 may be again split in a QT form. In a subordinate node having a depth of a level 2, a node (i.e., a leaf node) that is no longer split corresponds to a CU. For example, as shown in FIG. 3B, CU(c), CU(h), and CU(i) corresponding to nodes c, h, and I are split twice in the CTU and have a depth of a level 2.

Further, at least one of nodes having a depth of a level 2 may be again split in a QT form. In a subordinate node having a depth of a level 3, a node (i.e., a leaf node) that is no longer split corresponds to a CU. For example, as shown in FIG. 3B, CU(d), CU(e), CU(f), and CU(g) corresponding to d, e, f, and g are split three times in the CTU and have a depth of a level 3.

The encoder may determine a maximum size or a minimum size of the CU according to a characteristic (e.g., a resolution) of video or in consideration of encoding efficiency. Information thereof or information that can derive this may be included in bitstream. A CU having a maximum size may be referred to as a largest coding unit (LCU), and a CU having a minimum size may be referred to as a smallest coding unit (SCU).

Further, the CU having a tree structure may be hierarchically split with predetermined maximum depth information (or maximum level information). Each split CU may have depth information. Because depth information represents the split number and/or a level of the CU, the depth information may include information about a size of the CU.

Because the LCU is split in a QT form, when using a size of the LCU and maximum depth information, a size of the SCU may be obtained. Alternatively, in contrast, when using a size of the SCU and maximum depth information of a tree, a size of the LCU may be obtained.

For one CU, information representing whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In the example of FIGS. 3A and 3B, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller subordinate TU. For example, a size of the TU may be determined to any one of 32×32, 16×16, 8×8, and 4×4, but the present invention is not limited thereto, and when the TU is high resolution video, a size of the TU may increase or may be various sizes.

For one TU, information representing whether a corresponding TU is split may be transferred to the decoder. For example, the information may be defined to a split transform flag and may be represented with a "split_transform_flag".

The split transform flag may be included in entire TUs, except for a TU of a minimum size. For example, when a value of the split transform flag is '1', a corresponding TU is again split into four TUs, and a value of the split transform flag is '0', a corresponding TU is no longer split.

As described above, the CU is a basic unit of coding that performs intra prediction or inter prediction. In order to more effectively code input image, the CU may be split into a prediction unit (PU).

A PU is a basic unit that generates a prediction block, and a prediction block may be differently generated in a PU unit even within one CU. The PU may be differently split according to whether an intra prediction mode is used or an inter prediction mode is used as a coding mode of the CU to which the PU belongs.

FIG. 4 and FIGS. 5A and 5B are diagrams for describing a method for performing an intra prediction based on a relation between block partition information and a directionality of a coding mode as embodiments to which the present invention is applied.

An intra prediction may be applied to a partition block of a square shape. However, using such a method, there is little error when predicting a sample of a position near to a reference sample, but the prediction accuracy may be degraded as a distance between the reference sample and a predicted position increases. Accordingly, in the present invention, in order to supplement it, a method is introduced to decrease the distance between the reference sample and the predicted position. In the present specification, this is referred to as short distance intra prediction (SDIP).

In an embodiment of the present invention, a shape of a prediction block when an intra prediction is performed may be defined as a rectangle or a line. As such, a prediction and a reconstruction are performed in a unit of smaller rectangle or line in a block, and accordingly, prediction error may be more decreased.

In the present invention, the prediction and reconstruction process are progressed in a unit of a rectangle or a line, and accordingly, there may be a difference in accuracy depending on a prediction direction. For example, in the case that a current block is in a vertical direction mode as shown in FIG. 5A, a prediction error may be efficiently decreased by partitioning the current block into four horizontal directions by considering a distance from a reference sample.

As another example, in the case that a current block is in a horizontal direction mode as shown in FIG. 5B, a prediction error may be efficiently decreased by partitioning the current block into vertical direction such that a distance from a reference sample is closer to a left side than an upper side.

FIG. 6 illustrates a syntax structure for describing a process of deriving a prediction mode based on the Short Distance Intra Prediction (SDIP) direction information as an embodiment to which the present invention is applied.

In the case that a decoder to which the present invention is applied receives block partition information faster than a prediction mode (step, S610), the prediction mode may be derived based on the block partition information.

For example, when number 2 to number 17 intra prediction modes indicate horizontal direction modes and number 18 to number 34 intra prediction modes indicate vertical direction modes, in the case that the current block partition information is in the horizontal shape, it may be implemented that only number 18 to number 34 may receive the intra prediction modes for the block partition. In this case, the number of prediction modes for the current block may be decreased in half, and accordingly, the indication bits for indicating a prediction mode may be saved.

It may be checked whether the coding mode of the current block is the intra prediction mode. In the case that the coding mode of the current block is the intra prediction mode, a decoder may obtain SDIP flag information (step, S620). Here, the SDIP flag information may mean the information indicating whether the SDIP is applied, which may be represented by sdip_flag. The SDIP may mean the case of receiving the prediction mode limitedly based on a shape of the block partition in the case that the current block is partitioned.

According to the SDIP flag information, in the case that the SDIP is applied, the decoder may receive SDIP direction information (step, S630). Here, the SDIP direction information may mean the information indicating a direction in which the SDIP is applied, which may be represented by sdip_direction. For example, the SDIP direction information may indicate a vertical direction or a horizontal direction, but the present invention is not limited thereto. Otherwise, the SDIP direction information may be defined by a flag.

In addition, when the current coding block is an intra mode, sdip_flag=1, and sdip_direction=1, prev_intra_luma_pred_flag[i] may be obtained (step, S640). Here, prev_intra_luma_pred_flag[i], mpm_idx[i] and rem_intra_luma_pred_mode[i] may be used for indicating an intra prediction mode for a brightness sample. When prev_intra_luma_pred_flag[i]=1, an intra prediction mode is derived from a neighboring intra-predicted prediction unit through mpm_idx[i] (step, S660). In the case that prev_intra_luma_pred_flag[i] is not 1, rem_intra_luma_pred_mode[i] may be obtained (step, S670). Here, rem_intra_luma_pred_mode[i] indicates an intra prediction mode transmitted from an encoder.

According to the present invention, after the SDIP direction information is checked, an accurate intra prediction mode of the current block may be derived through an induction formula as represented in Equation 1 and Equation 2 below.

$$currIntraMode=rem\_intra\_luma\_pred\_mode[\ ][\ ]+offset \quad \text{[Equation 1]}$$

$$offset=(sdip\_direction==DIR\_HORIZONTAL?18:0) \quad \text{[Equation 2]}$$

Referring to Equation 1 above, more accurate intra prediction mode may be obtained by using an offset value that indicates a difference value from the transmitted intra prediction mode. In this case, the offset value indicates 18 when sdip_direction is a horizontal direction, and otherwise, the offset value indicates 0.

FIG. 7 and FIG. 8 are diagrams for describing a method for configuring Most Probable Mode (MPM) index based on the Short Distance Intra Prediction (SDIP) direction information as an embodiment to which the present invention is applied.

According to an embodiment of the present invention, when constructing a Most Probable Mode (MPM) in an environment in which two or more Most Probable Modes (MPMs) are used, priorities of a left block and an above block may be differently applied according to the SDIP direction information sdip_direction. As such, by differently applying the priorities of a left block and an above block that construct a Most Probable Mode (MPM) according to the SDIP direction information sdip_direction, MPM index information may be skewed in forward direction. Through this, a gain may be obtained when performing an entropy coding (e.g., CABAC).

For example, as shown in FIG. 7, when the SDIP direction information sdip_direction indicates a vertical direction, MPM index 1 may be allocated to the intra prediction mode candIntraPredModeA of the above block and MPM index 2 may be allocated to the intra prediction mode candIntraPredModeB of the left block.

In addition, as shown in FIG. 8, when the SDIP direction information sdip_direction indicates a horizontal direction, MPM index 1 may be allocated to the intra prediction mode candIntraPredModeA of the left block and MPM index 2 may be allocated to the intra prediction mode candIntraPredModeB of the above block.

FIG. 9 is a flowchart for describing a process of determining the best prediction unit based on a size of coding unit as an embodiment of the present invention.

The present invention provides a method of defining a prediction unit, which is a unit of prediction of an intra block, in a rectangular shape and a line shape, and coding it.

In addition, in the case that a prediction unit of an intra block is defined in a rectangular shape, the present invention is to propose a method for coding it into a Quadtree transform unit of a square shape or a rectangular shape.

As an embodiment to which the present invention is applied, FIG. 9 describes a process that an intra block is encoded.

When an input image is inputted in an intra prediction unit, in order to an optimal PU type, an intra prediction may be performed for all PU types.

Alternatively, in order to optimize an encoder, an intra prediction may be performed for a part of PUs according to a condition. In this case, for each PU, it may be selected which mode is the most proper in the aspect of a Rate-distortion (RD) cost with respect to all intra modes or a part of intra modes promised to decode.

For example, in the case that an optimal mode is selected for a certain PU type, after the same operation is performed for different PU type according to a size of a coding unit (CU), an optimal PU type may be selected in the aspect of a Rate-distortion (RD) cost. When the optimal intra prediction mode and the PU type are determined, the PU type and the intra prediction mode and transform unit (TU) information are transformed into a frequency domain, and quantized residual signal and the like may be transmitted to a decoder.

As a particular example, first, an encoder may check an intra mode of a current block (step, S910). Furthermore, with respect to 2N×2N PU which is the minimum RD cost, an optimal intra prediction mode may be selected (step, S920).

The encoder may check whether a size of the current coding unit is 8×8 (step, S930). At this time, in the case that a size of the current coding unit is not 8×8, an optimal intra prediction mode with respect to 2N×2N PU which is selected may be determined as a final intra prediction mode.

However, in the case that a size of the current coding unit is 8×8, the intra mode of the current coding unit may be checked (step, S940), and an optimal intra prediction mode with respect to N×N PU which is the minimum RD cost may be selected (step, S950).

In addition, it may be determined an optimal PU size corresponding to the minimum RD cost (step, S960).

FIG. 10 is a flowchart for describing a decoding process when a coding unit includes a plurality of transform units as an embodiment of the present invention.

When a bit stream transmitted by being encoded in an encoder is inputted in a decoder, in order to decode the input bit stream, it may be required to pars additional information. In the case that information for an image which is going to be decoded is parsed, information for each CU may be parsed. In the case that a CU to be currently decoded is encoded in an intra mode, PU partition information for it, prediction mode information for each PU, TU information for a residual signal and information for a quantized residual signal which is transformed may be parsed (steps, S1010, S1020 and S1030).

After a prediction signal for the current block is generated by using the parsed information with respect to the block to be decoded currently and neighboring information which is already decoded (step, S1040), an intra block may be decoded by dequantizing and inverse-transforming (step, S1050). At this time, since an intra block generates a prediction block and a residual signal using the decoded neighboring pixels, a limitation occurs that a size of TU is not greater than a size of PU in order to utilize the information of neighboring pixels as many as possible. Actually, it may be performed that as if a size of TU is a unit of prediction of an intra block. Accordingly, in the case that several TUs are existed in a single TU, since the prediction mode information is transmitted in a unit of PU, each PU uses an intra prediction mode as the same, and the prediction block may be generated in a unit of TU.

FIGS. 11A, 11B, and FIGS. 12A, 12B are diagrams for describing a method of defining a transform unit in a rectangular shape when an intra block is divided into a plurality of prediction units as embodiments to which the present invention is applied.

As an embodiment to which the present invention is applied, in the case that an intra block is divided into a plurality of prediction units, a method for defining a TU according to it is provided.

PU and TU in a Rectangular Shape with Respect to an Intra Prediction Block

When an input image is predicted with an intra mode, as shown in FIGS. 11A, 11B, and FIGS. 12A, 12B, an input image may be split into PUs that has a rectangular shape of ½ size of a CU.

As an embodiment, in the case that several PUs are existed in a single CU, in an intra block encoding, by applying the limitation that a size of TU is not greater than a size of PU, a depth of residual Quadtree (RQT) which is split information of a TU may be defined as a value greater than 0. In addition, a CU may be a reference of dividing into a Quadtree.

As another embodiment of the present invention, when splitting a TU, a shape of TU may be defined according to a shape of PU. For example, a Quadtree structure may be maintained by splitting it into four parts in a transverse direction and a longitudinal direction.

Meanwhile, when splitting a TU, a TU depth may be increased until the transverse or longitudinal length value cannot be divided by 4 according to the shape of PU. In the case that several PUs are existed in a single CU, since there is a different intra prediction mode for each PU, more detailed intra prediction is available. In addition, generally, when performing an intra block prediction, since the accuracy of a generated prediction pixel value becomes degraded, a size of the residual signal may also be increased.

In the case of performing encoding using the present invention, a distance between reference pixels becomes narrowed in comparison with the case of using an intra block unit of a square shape. A position of a reference pixel of an intra prediction may be changed according to a prediction mode (direction and DC, non-directional mode like planar), in the case of generating a prediction block using the present invention, it is available to generate more accurate prediction block according to the reference pixel position determined by a prediction mode.

Accordingly, more accurate prediction block may be generated using the present invention, and accordingly, a size of a residual signal becomes decreased, thereby an amount of energy for transmitting it being decreased consequently.

FIGS. 13A, 13B, and FIGS. 14A, 14B are diagrams for describing a method of splitting a transform unit in a rectangular shape based on a coding unit or a prediction unit when an intra block is divided into a plurality of prediction units as embodiments to which the present invention is applied.

PU and TU in a Rectangular Shape with Respect to an Intra Prediction Block

When an input image is predicted with an intra mode, as shown in FIGS. 13A, 13B, and FIGS. 14A, 14B, an input image may be split into PUs that has a rectangular shape of ½ size of a CU. In the case that several PUs are existed in a single CU, in an intra block encoding, by applying the limitation that a size of TU is not greater than a size of PU, it is assumed that a size when a TU depth is 0 is the same as that of PU. In addition, a PU may be designated as a reference of constructing a Quadtree TU structure. Otherwise, it may be defined that it is split in an Octatree with reference to a CU.

When splitting a TU, a shape of PU is maintained, and a Quadtree is maintained by splitting it into four parts by dividing lengths of transverse side and longitudinal side by 2. When splitting a TU, a TU depth may be increased until the transverse or longitudinal length value cannot be divided by 2 according to the shape of PU.

In the case that plural PUs are existed in a single intra CU, since each PU may has a different intra prediction mode, more detailed intra prediction may be performed. In addition, generally, when performing an intra block prediction, since the accuracy of a generated prediction pixel value becomes degraded, a size of the residual signal may also be increased.

In the case of performing encoding using the present invention, a distance between reference pixels becomes narrowed in comparison with the case of using an intra block unit of a square shape. A position of a reference pixel of an intra prediction may be changed according to a prediction mode (direction and DC, non-directional mode like planar), in the case of generating a prediction block using the present invention, it is available to generate more accurate prediction block according to the reference pixel position determined by a prediction mode.

Accordingly, more accurate prediction block may be generated using the present invention, and accordingly, a size of a residual signal becomes decreased, thereby an amount of energy for transmitting it being decreased consequently.

FIGS. 15A, 15B, and FIGS. 16A, 16B are diagrams for describing a method of defining a transform unit in a square shape when an intra block is divided into a plurality of prediction units as embodiments to which the present invention is applied.

PU in a Rectangular Shape and TU in a Square Shape with Respect to an Intra Prediction Block When an input image is predicted with an intra mode, as shown in FIGS. 15A, 15B, and FIGS. 16A, 16B, an input image may be split into PUs that has a rectangular shape of ½ size of a CU. In the case that several PUs are existed in a single CU, in an intra block encoding, by applying the limitation that a size of TU is not greater than a size of PU, a depth of residual Quadtree (RQT) which is split information of a TU is fixed as a value greater than 0. In addition, a CU is a reference of dividing into a Quadtree.

In addition, when splitting a TU, a Quadtree is maintained by splitting a size (within the range in which a size of TU is not greater than a size of PU) that may be defined interior of a PU into four parts in a square shape. When splitting a TU, a TU depth may be increased until the transverse or longitudinal length value cannot be divided by 2 according to the shape of PU.

In the case that several PUs are existed in a single CU, since there is a different intra prediction mode for each PU, more detailed intra prediction is available. In addition, generally, when performing an intra block prediction, since the accuracy of a generated prediction pixel value becomes degraded, a size of the residual signal may also be increased.

In the case of performing encoding using the present invention, a distance between reference pixels becomes narrowed in comparison with the case of using an intra block unit of a square shape. A position of a reference pixel of an intra prediction may be changed according to a prediction mode (direction and DC, non-directional mode like planar), in the case of generating a prediction block using the present invention, it is available to generate more accurate prediction block according to the reference pixel position determined by a prediction mode.

Accordingly, more accurate prediction block may be generated using the present invention, and accordingly, a size of a residual signal becomes decreased, thereby an amount of energy for transmitting it being decreased consequently.

PU in a Rectangular Shape and TU in a Mixed Shape with Respect to an Intra Prediction Block When an input image is predicted with an intra mode, the shape of square or rectangular TU may be used with being mixed. According to the block size of a PU and a TU, in the case that a split able to be divided by 2 or 4 is available, the rectangular shape and the square shape may be used with being mixed.

In order for a decoder to distinguish it is a partition of the square shape or a partition of the rectangular shape, the partition information may be received directly from an encoder, a rule may be defined according to a TU depth, or a rule may be defined according to a block size of a CU, a PU or a TU.

For example, when the partition information is received from an encoder, the entire image may be controlled through VPS, SPS, PPS, and the like, a slice of image may be controlled through a slice header, or each block may be controlled with being included in a CU header.

FIG. 17 is a flowchart for describing a process of determining optimal partition information in the aspect of RC cost as an embodiment to which the present invention is applied.

An encoder to which the present invention is applied may perform an intra prediction with respect to 2N×2N PU of a current block (step, S1710), perform an intra prediction with respect to the next 2N×N PU (step, S1720), perform an intra prediction with respect to N×2N PU (step, S1730), and perform an intra prediction with respect to N×N PU (step, S1740).

As such, after performing an intra prediction with respect to PUs of various types, the optimal partition information may be determined according to the RC cost (step, S1750).

As another embodiment to which the present invention is applied, for an intra block or an inter block, when a PU is not partitioned in a rectangular shape, a TU depth may be partitioned in Quadtree in the rectangular shape described above starting from 0.

As another embodiment to which the present invention is applied, the TU partitioning in the rectangular shape described above may be similarly applied to an intra prediction unit of an encoder or a decoder.

As another embodiment to which the present invention is applied, in the case that the partition information is received, which indicates whether a TU in the rectangular shape or a TU in the square shape described above is used, the partition information may be received with being included in VPS, SPS, PPS or a slice header. Otherwise, the partition information may be received for each block with being included in a CU header.

As another embodiment to which the present invention is applied, when encoding/decoding an intra block, a shape of a TU may be defined according to a shape of a PU. For example, in the case that a PU with respect to the current intra block is defined in a square shape such as 2N×2N and N×N, the shape of TU may also be defined as a square shape.

As another example, in the case that a PU of an intra block is defined in a rectangular shape such as 2N×N and N×2N, a TU may be defined as a similar shape not greater than a PU.

As described above, the embodiments described in the present invention may be performed by being implemented on a processor, a microprocessor, a controller or a chip. For example, the functional units depicted in FIG. 1 and FIG. 2 may be performed by being implemented on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of decoding a video signal, comprising:
obtaining block partition information of a current coding unit;
receiving flag information indicating whether the current coding unit is partitioned based on a distance from a reference sample;
based on the current coding unit being partitioned based on the distance from the reference sample, deriving an intra prediction mode of a partition block based on the block partition information and receiving direction information indicating a partition direction of the current coding unit; and
generating a prediction signal of the partition block based on the derived intra prediction mode,
wherein the intra prediction mode of the partition block is defined by a limited number based on a prediction direction, and
wherein the intra prediction mode is derived by a summation of a transmitted prediction mode value and an offset value.

2. The method of claim 1,
wherein the partition direction of the current coding unit indicates a horizontal direction or a vertical direction.

3. The method of claim 1,
wherein the offset value is determined based on the direction information.

4. The method of claim 1,
wherein the offset value corresponds to a minimum value among values indicating a prediction mode of a vertical direction when the direction information indicates a horizontal direction, and indicates 0 otherwise.

* * * * *